United States Patent [19]

Mueller et al.

[11] 4,247,940

[45] Jan. 27, 1981

[54] EQUALIZER FOR COMPLEX DATA SIGNALS

[75] Inventors: Kurt H. Mueller, Wallisellen, Switzerland; Jean J. Werner, Eatontown, N.J.

[73] Assignee: Bell Telephone Laboratories, Incorporated, Murray Hill, N.J.

[21] Appl. No.: 84,803

[22] Filed: Oct. 15, 1979

[51] Int. Cl.$^3$ .............................................. H04L 25/08
[52] U.S. Cl. ........................................ 375/14; 375/15; 375/16
[58] Field of Search ............................. 375/14, 15, 16; 364/724; 333/18

[56] References Cited

U.S. PATENT DOCUMENTS

| 3,617,948 | 11/1971 | Lucky | 333/18 |
| 3,755,738 | 8/1973 | Gitlin | 325/42 |
| 3,878,468 | 4/1975 | Falconer | 325/320 |
| 3,947,768 | 3/1976 | Desblache | 325/42 |
| 4,032,762 | 6/1977 | Caloyannides | 235/152 |

OTHER PUBLICATIONS

Pro. of the Nat. Telecomm. Conf., vol. 1, 1977, Qureshi et al., "Perform. & Prop. of a T/Z Equalizer", pp. 11:1-1–11:1-9.

Primary Examiner—Harold I. Pitts
Attorney, Agent, or Firm—Ronald D. Slusky

[57] ABSTRACT

In a data receiver (40) for a quadrature-amplitude-modulated signal s(t) having symbol interval T, line samples ($s_k$) are formed at a sampling frequency n/T which is at least equal to the Nyquist frequency. With the sampling being performed at this rate, the functions conventionally provided by individual bandpass filter (12), phase splitter (14) and equalizer (22) circuits are performed by a single transversal filter equalizer (122). Tap coefficients for the transversal filter equalizer are derived in a decision-directed manner. The tendency of the tap coefficient values to drift is suppressed by adding energy to the received signal at frequencies within the band (0−n/2T) Hz at which the received signal has negligible energy.

14 Claims, 4 Drawing Figures

EQUALIZER FOR COMPLEX DATA SIGNALS

BACKGROUND OF THE INVENTION

The present invention relates to automatic equalizers which compensate for the distorting effects of bandlimited channels on transmitted data signals.

Automatic equalizers are necessary for accurate reception of high-speed data signals transmitted over bandlimited channels with unknown transmission characteristics. The equalizer, which forms a part of an overall data receiver, is generally in the form of a transversal filter in which successive line samples of a previously-filtered incoming data signal are multiplied by respective tap coefficients. The resulting products are added together to generate an equalizer output which is then demodulated and/or quantized to recover the transmitted data. In addition, an error signal is formed equal to the difference between the equalizer output and a reference signal which represents the transmitted data symbol. The value of the symbol that was transmitted may be known at the receiver a priori, as is the case in many equalizer start-up arrangements. Alternatively, in the so-called adaptive type of automatic equalizer, the reference signal is derived from the decision made in the receiver (on the basis of the equalizer output value) as to what data symbol was transmitted. In either case, the error signal is used to update the tap coefficient values in accordance with an algorithm which minimizes a measure of the distortion—assumed to be primarily intersymbol interference—introduced by the channel.

In some applications, the equalization process entails specialized kinds of signal processing. In particular, as shown in U.S. Pat. No. 3,755,738 issued Aug. 28, 1973, to R. D. Gitlin et al, for example, recovery of the data contained in a quadrature-amplitude-modulated (QAM) signal conventionally involves generation of two versions of the received passband signal—a so-called Hilbert transform pair. These may be generated, for example, by a "phase splitter" comprised of analog filter sections. While generally satisfactory in operation, the analog phase splitter is relatively bulky, must be manufactured to close tolerances, and must be individually tested at the factory. Its parameters are also subject to variation due to such effects as temperature drift and component aging.

The above problems can be ameliorated by realizing the phase splitter with integrated circuit active filters. These, however, are sensitive to radio frequency interference created by static discharges. The phase splitter could also be realized with digital circuitry. The principal drawback to this approach is that it substantially increases the time required to begin forming the data decisions.

SUMMARY OF THE INVENTION

The principal object of the present invention is thus to provide a simple and inexpensive alternative to the phase splitter used in prior art QAM receivers.

The invention is founded on the following recognition: If a QAM signal is sampled at a high enough rate, i.e., at at least the Nyquist frequency, the phase splitter could be implemented via a non-recursive transversal filter. The Hilbert transform pair outputs of such a phase splitter would each be comprised of linear combinations of the line samples applied to the phase splitter. These could then be applied to a conventional transversal filter equalizer, the outputs of which would, again, be comprised of linear combinations of the signals applied to it.

This being so, we have furtther recognized that the transfer characteristic of the above-postulated cascade of distinct phase-splitter and equalizer filters can be realized by a single transversal filter which, when an appropriate tap coefficient updating algorithm is used, will provide substantially the same mapping of input signal to equalizer outputs as the two-filter cascade. Indeed, the function of the bandpass filter which generally proceeds the phase-splitter is likewise automatically provided by this arrangement.

A receiver designed in accordance with the present invention requires fewer multiplications than the above suggested all-digital cascade. The invention will not, in general, provide a reduction in the number of multiplications over the more conventional analog filter arrangement. However, as an all-digital approach, it avoids many of the drawbacks attendant to the use of the analog filters.

DETAILED DESCRIPTION

Figure 1:
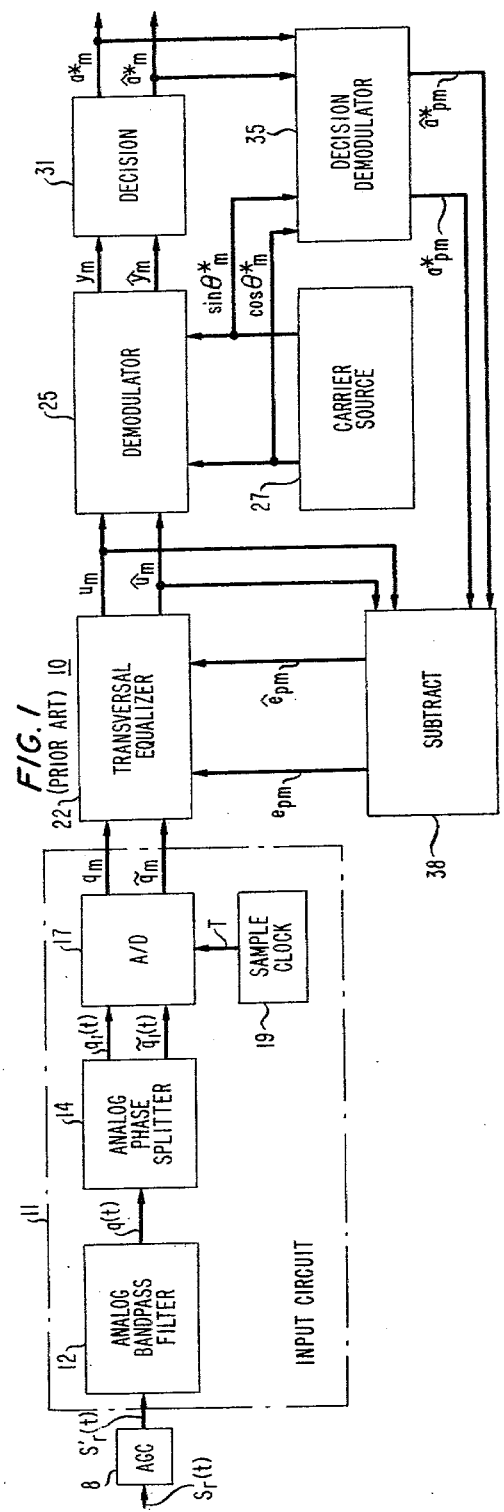
FIG. 1 is a block diagram of a prior art quadrature-amplitude-modulaton (QAM) receiver.

FIG. 1 depicts a prior art receiver 10 for data signals transmitted from a transmitter (not shown) over a bandlimited channel, e.g., voiceband telephone circuit. The data signals are illustratively quadrature-amplitude-modulated (QAM) data signals wherein four paralleled information bits are transmitted during each of a succession of symbol intervals of duration $T = 1/2400$ sec. The symbol rate is thus 2400 baud, yielding a binary transmission rate of 9600 bits per second. The four bits to be transmitted during successive symbol intervals are encoded into two trains of data symbol components. The latter are modulated onto respective carriers which are in quadrature relation, i.e., have a 90 degree phase difference. In particular, the four bits to be transmitted during the $m^{th}$ symbol interval are encoded into two data symbol components $a_m$ and $\hat{a}_m$, each of which can take on one of the four values $[+1, -1, +3, -3]$. Components $a_m$ and $\hat{a}_m$ respectively comprise the real and imaginary components of a complex data symbol $A_m$. Components $a_m$ and $\hat{a}_m$ amplitude modulate respective 1800 Hz in-phase and quadrature-phase carrier waves. The modulated signals, when added together, form a QAM signal $s(t)$ which is of the form $$s(t) = Re[\sum_m (a_m + j\hat{a}_m)g(t - mT)e^{j\omega_c t}]$$

where $g(t)$ is a real function and $\omega_c$ is the radian carrier frequency. Signal $s(t)$ is then transmitted to receiver 10.

In receiver 10, the received version of signal $s(t)$, $s_r(t)$, passes through automatic gain control circuit 8 where it emerges as signal $s_r'(t)$. The latter is applied to an input circuit 11 comprised of analog bandpass filter 12, analog phase splitter 14, analog-to-digital (a/d) converter 17 and sample clock 19. The function of filter 12 is to filter out any energy in signal $s_r'(t)$ outside of the transmission band of interest—in this example the band 300–3000 Hz. Phase splitter 14 responds to the output signal q(t) of filter 12 to generate two versions of signal q(t). One of these is $q_1(t)$. The other, represented as $\tilde{q}_1(t)$, is the Hilbert transform of $q_1(t)$.

Signals $q_1(t)$ and $\tilde{q}_1(t)$ are passed to a/d converter 17. The latter, operating under the control of clock 19, generates an equalizer input sample $Q_m$ during the $m^{th}$ receiver symbol interval of duration of T seconds. $Q_m$ has components $q_m$ and $\tilde{q}_m$, which are respective samples of signals $q_1(t)$ and $\tilde{q}_1(t)$.

Equalizer input sample components $q_m$ and $\tilde{q}_m$ pass out of input circuit 11 and on to transversal filter equalizer 22. The output of the latter is complex passband equalizer output $U_m$ having components $u_m$ and $\hat{u}_m$. Equalizer 22 generates its outputs by forming linear combinations of the equalizer input sample components in accordance with the relations $$u_m = c_m^T r_m + d_m^T \hat{r}_m$$

$$\hat{u}_m = c_m^T \hat{r}_m - d_m^T r_m$$

In these expressions $r_m$ and $\hat{r}_m$ are (N×1) matrices, or vectors, respectively comprised of the N most recent real and imaginary equalizer input sample components, N being a selected integer. That is $$r_m = \begin{bmatrix} q_k \\ q_{k-1} \\ \vdots \\ q_{k-(N-1)} \end{bmatrix} \text{ and } \hat{r}_m = \begin{bmatrix} \hat{q}_k \\ \hat{q}_{k-1} \\ \vdots \\ \hat{q}_{k-(N-1)} \end{bmatrix}.$$

In addition, $c_m$ and $d_m$ are (N×1) vectors each comprised of an ensemble of N tap coefficients having values associated with the $m^{th}$ receiver interval. (The superscript "T" used in the above expressions indicates the matrix transpose operation wherein the (N×1) vectors $c_m$ and $d_m$ are transposed into (1×N) vectors for purposes of matrix multiplication.) The values of the coefficients in these vectors are determined in the manner described below.

Passband equalizer output $U_m$ is demodulated by demodulator 25 to yield baseband equalizer output $Y_m$. The latter and passband equalizer output $U_m$ respectively represent baseband and passband versions of transmitted symbol $A_m$. Baseband equalizer output $Y_m$ has real and imaginary components $y_m$ and $\hat{y}_m$, the demodulation process being expressed as $$y_m = u_m \cos \theta_m^* + \hat{u}_m \sin \theta_m^*$$

$$\hat{y}_m = -u_m \sin \theta_m^* + \hat{u}_m \cos \theta_m^*,$$

$\theta_m^*$ being an estimate of the current carrier phase. For purposes of generating $y_m$ and $\hat{y}_m$ in accordance with the above expressions, demodulator 25 receives representations of $\cos \theta_m^*$ and $\sin \theta_m^*$ from a carrier source 27.

Baseband equalizer output $Y_m$ is quantized in decision circuit 31. The resulting output $A_m^*$ is a decision as to the value of the transmitted symbol $A_m$. In particular, the real and imaginary parts of $A_m^*$, $a_m^*$ and $\hat{a}_m^*$, are decisions as to the data signal values represented by the real and imaginary components $a_m$ and $\hat{a}_m$ of transmitted symbol $A_m$. Decision circuit 31, more particularly, forms decision $a_m^*(\hat{a}_m^*)$ by identifying the one of the four possible data signal values $[+1, -1, +3, -3]$ which is closest to the value of equalizer output component $y_m(\hat{y}_m)$.

Decision $A_m^*$ is also used to generate an error signal for use in updating coefficient vectors $c_m$ and $d_m$. In particular, decision components $a_m^*$ and $\hat{a}_m^*$ are combined in decision remodulator 35 with $\sin \theta_m^*$ and $\cos \theta_m^*$ from carrier source 27 to form remodulated, or passband, decision $A_{pm}^*$. The real and imaginary components of $A_{pm}^*$, $a_{pm}^*$ and $\hat{a}_{pm}^*$, are formed in accordance with $$a_{pm}^* = a_m^* \cos \theta_m^* - \hat{a}_m^* \sin \theta_m^*$$

$$\hat{a}_{pm}^* = a_m^* \sin \theta_m^* + \hat{a}_m^* \cos \theta_m^*.$$

Passband decision $A_{pm}^*$ is subtracted from passband equalizer output $U_m$ in subtractor 38 to yield passband error $E_{pm}$ having components $e_{pm}$ and $\hat{e}_{pm}$ given by $$e_{pm} = u_m - a_{pm}^*$$

$$\hat{e}_{pm} = \hat{u}_m - \hat{a}_{pm}^*.$$

Error signal components $e_{pm}$ and $\hat{e}_{pm}$ are extended to equalizer 22 for purposes of updating the values of the coefficients in coefficient vectors $c_m$ and $d_m$ in preparation for the next, $(m+1)^{st}$, symbol interval. The so-called mean-squared error stochastic updating algorithm is illustratively used, yielding the updating rules $$c_{m+1} = c_m - \alpha [r_m e_{pm} + \hat{r}_m \hat{e}_{pm}]$$

$$d_{m+1} = d_m - \alpha [\hat{r}_m e_{pm} - r_m \hat{e}_{pm}],$$

$\alpha$ being a predetermined constant.

Figure 2:
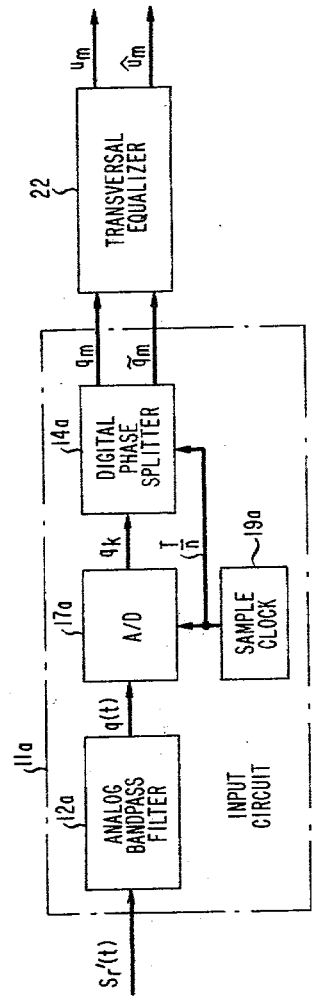
FIGS. 2 and 3 are alternate input circuits for use in the receiver of FIG. 1.

The principle underlying the present invention will now be explained with reference to FIG. 2. Assume that input circuit 11 were replaced by input circuit 11a shown in FIG. 2. Circuit 11a includes analog bandpass filter 12a, which receives signal $s_r'(t)$ and which is illustratively identical to filter 12 in input circuit 11. Output signal q(t) of filter 12a is extended to a/d converter 17a. The latter is operated by sample clock 19a n times per symbol interval to form samples of signal q(t). More particularly, a/d converter 17a generates a sample $q_k$ in response to the $k^{th}$ clock pulse from clock 19a. The parameter n is selected such that the frequency n/T with which the samples of signal q(t) are formed is at least equal to the Nyquist frequency, i.e., at least twice the highest frequency component of q(t). With this criterion met, the function of phase splitter 14 can be realized in input circuit 11a by digital phase splitter 14a. The latter, in turn, is illustratively realized as a pair of non-recursive transversal filters. Each of the transversal filters generates one of the phase splitter outputs in response to the samples provided by a/d converter 17a.

Unlike the coefficients used in equalizer 22, the coefficients used in phase splitter 14a are time-invariant since the filter characteristic is time-invariant. Moreover, equalizer 22, which follows phase splitter 14a, requires a Hilbert transform pair derived from signal q(t) only once per symbol interval. Thus, even though phase splitter 14a receives n line samples per symbol interval, it generates an equalizer input sample only once per symbol interval. The equalizer input samples generated by phase splitter 14a are substantially identical to those generated by a/d converter 17 of input circuit 11. Hence, the Hilbert transform components generated by the former during the $m^{th}$ receiver symbol interval, like those generated by the latter, are represented as $q_m$ and $\bar{q}_m$.

Since phase splitter 14a is comprised of a pair of nonrecursive transversal filters, components $q_m$ and $\bar{q}_m$ generated thereby are comprised of respective linear combinations of some finite number of previous outputs of a/d converter 17a. As previously noted, passband equalizer output components $u_m$ and $\hat{u}_m$, in turn, are comprised of respective linear combinations of the components applied to equalizer 22. Components $u_m$ and $\hat{u}_m$ are thus also comprised of linear combinations of some finite number of previous outputs of a/d converter 17a. This being so, we have recognized that the transfer characteristic of the cascade comprised of phase splitter 14a and equalizer 22 can be realized in accordance with the invention by a single transversal filter pair. The coefficients used in the latter, which will be nonlinear functions of the time-invariant coefficients of filter 14a and the adaptively updated coefficients of equalizer 22, can be readily arrived at in the conventional adaptive, decision-directed manner by using an appropriate tap coefficient updating algorithm.

Figure 3:
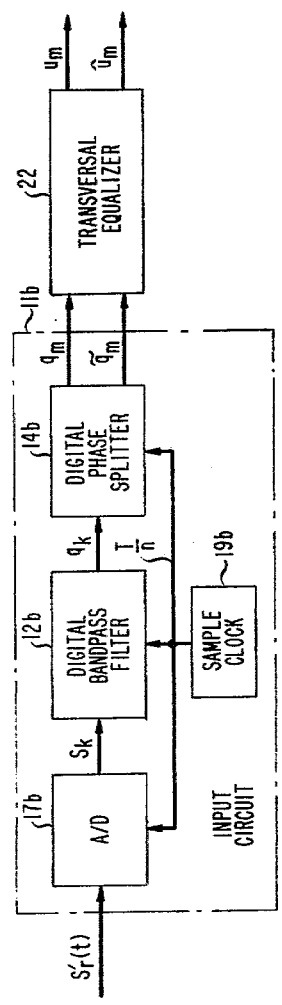

Indeed, since a bandpass filter can also be realized as a nonrecursive transversal filter, input circuit 11a could be replaced by input circuit 11b of FIG. 3. Here, input signal $s_r'(t)$ is applied to a/d converter 17b which operates n times per symbol interval under the control of clock 19b to generate sample $s_k$ of signal $s_r'(t)$ in response to the $k^{th}$ clock pulse. Bandpass filter 12b, now a nonrecursive transversal filter, responds by generating the sample $q_k$. The latter, as in circuit 11a, is applied to digital phase splitter 14b which, in turn, generates equalizer input sample components $q_m$ and $\bar{q}_m$. Following the same reasoning as before, it will be seen that passband equalizer output components $u_m$ and $\hat{u}_m$ are respective linear combinations of some finite number of previous a/d converter output samples. This being so, the transfer function of the cascade comprised of filter 12b, phase-splitter 14b and equalizer 22 can be realized in accordance with the invention, with but a single transversal filter pair using an appropriate coefficient updating algorithm.

Figure 4:
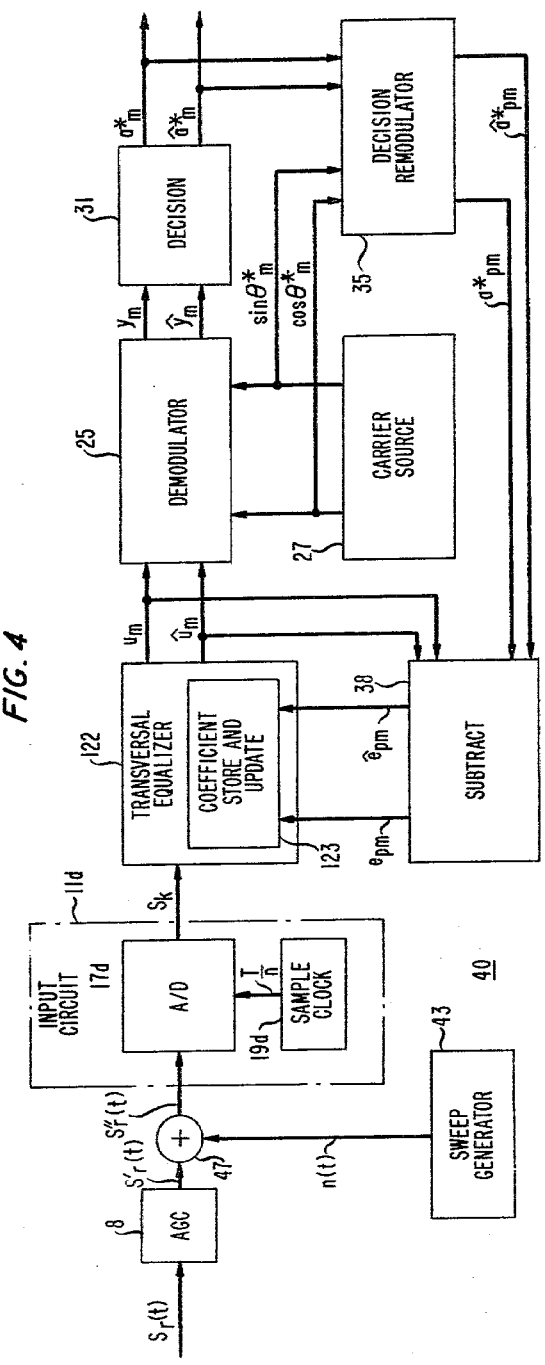
FIG. 4 is a block diagram of a QAM receiver embodying the principles of the present invention.

FIg. 4 shows a receiver 40 embodying the principles of the invention as discussed above. Receiver 40 is similar to receiver 10 except that circuit 11 and equalizer 22 have been replaced by input circuit 11d and equalizer 122.

Input circuit 11d includes only a/d converter 17d and sample clock 19d. The latter operates the former once every $T/n$ seconds, forming equalizer input sample $s_k$ in response to the $k^{th}$ clock pulse. Sample $s_k$ extends to transversal equalizer 122. Once every T seconds, equalizer 122 generates passband equalizer output components $u_m$ and $\hat{u}_m$ in accordance with the invention, those outputs being given by $$u_m = c_m^T p_m$$

$$\hat{u}_m = d_m^T p_m.$$

Here, $p_m$ is an $(M \times 1)$ vector comprised of the M most recent a/d converter output samples. That is, $$p_m = \begin{bmatrix} s_k \\ s_{k-1} \\ \vdots \\ s_{k-(M-1)} \end{bmatrix}$$

(In order to obtain equalization comparable to that obtained in receiver 10, M should be equal to $n \times N$.) In addition, $c_m$ and $d_m$ are $(M \times 1)$ vectors (transposed for matrix multiplication) each comprised of an ensemble of M tap coefficients having values associated with the $m^{th}$ receiver interval. The above expressions thus indicate that $u_m$ ($\hat{u}_m$) is equal to the sum of the products of the M most recent a/d converter output samples with respective ones of the coefficients in vector $c_m$ ($d_m$).

The processing of equalizer output $U_m$ in receiver 40 is identical to that in receiver 10, while coefficient updating is performed in accordance with $$c_{m+1} = c_m - \alpha p_m e_{pm}$$

$$d_{m+1} = d_m - \alpha p_m \hat{e}_{pm}.$$

The values of the coefficients arrived at via this updating process are, of course, different from the coefficient values arrived at in receiver 10 of FIG. 1. A coefficient store and update unit 123 within equalizer 122 is shown explicitly in FIG. 4. Such a unit would, of course, also be provided in equalizer 22.

Since equalizer 122 receives a plurality of samples per symbol interval, it has the properties of the so-called fractionally spaced equalizer. Among the significant advantages of the fractionally spaced equalizer over the more conventional baud, or synchronous, equalizer, is insensitivity to channel delay distortion, including sampling phase errors. There is, however, at least one significant problem unique to the fractionally-spaced equalizer. In a synchronous equalizer, one set of tap coefficients is clearly optimum, i.e., provides the smallest mean-squared error. By contrast, many sets of coefficient values provide approximately the same mean-squared error in the fractionally-spaced equalizer. As a consequence of this property, the presence of small biases in the coefficient updating processing hardware—such as biases associated with signal value roundoff—can cause at least some of the coefficient values to drift to very large levels, or "blow-up", even though the mean-squared error remains at, or close to, its minimum value. The registers used to store the coefficients or other signals computed during normal equalizer operation can then overflow, causing severe degradation, or total collapse, of the system response.

This phenomenon is suppressed in receiver 40 via the technique disclosed in the commonly-assigned, copending U.S. patent application of J. J. Werner, Ser. No. 84,857, filed of even date herewith, hereby incorporated by reference. In accordance with that technique, signal energy is added to the received signal at frequencies within the band $(0-n/2T)$ Hz at which the received signal has negligible energy.

In receiver 40, in particular, the additional signal energy is provided from a sweep generator 43 and is added to signal $s_r'(t)$ via adder 47. The output signal of sweep generator 43, signal n(t), is illustratively a sine wave, the frequency of which is swept across substantially all of the band extending from just above the highest frequency component of $s_r'(t)$ to the frequency $n/2T$. The output signal of adder 47, signal $s_r'(t)$ is what is applied to a/d converter 17d. The amplitude of signal n(t) should be sufficiently large to suppress the tap drifting tendency, which amplitude can be readily ascertained by trial and error. As taught in the above-referenced patent application, the added signal energy may take other forms, in which case it may be more convenient to introduce it in digital form after a/d converter 17d. In either case, it is important that the additional signal energy be introduced after any automatic gain control circuitry.

Although a specific embodiment of the invention is shown and described herein, other arrangements are possible. For example, it is possible to first generate two baseband versions of the received passband signal by multiplying it in an orthogonal demodulator by $\sin(\omega_c t + \theta^*)$ and $\cos(\omega_c t + \theta^*)$ ($\theta^*$ being an estimate of the carrier phase), convert these to digital form at n/T samples per second and then equalize at baseband. Such an approach is advantageous in that it simplifies the demodulation process. On the other hand, it would require twice the number of multiplications as the passband equalization arrangement of FIG. 4; with such baseband equalization, the equalizer outputs would be formed in accordance with expressions similar to those used by equalizer 22 in receiver 10. Moreover, the baseband equalization approach introduces a delay between the demodulation and error-generation circuitry. This complicates the determination of $\theta^*$.

Alternatively, the received passband signal could be sampled at n/T samples per second and then passed through an equlizer which forms only one of the equalizer output components, e.g., $u_m$. This would then be passed through an orthogonal demodulator and the two outputs of the latter passed through respective fixed lowpass filters. The lowpass filters need not be distortion free but must be identical. The equalizer will compensate for any distortion introduced by the lowpass filters since they are within the tap coefficient adjustment loop. Although this structure is more complicated than that of FIG. 4, it may be advantageous in applications in which processing speed is a problem since it requires half the multiplications.

Various other arrangements embodying the principles of the invention will be able to be devised by those skilled in the art without departing from their spirit and scope.

We claim:

1. Apparatus for processing a received quadrature-amplitude-modulated (QAM) signal comprised of first and second trains of data symbol components having predetermined values, said components being modulated onto respective carriers which are in quadrature relation, said apparatus comprising,
   means (11d) for forming a succession of line samples of said QAM signal at a predetermined sampling frequency which is equal to at least twice the highest frequency component of said QAM signal,
   means (122) for forming first and second passband equalizer output components in response to said line samples,
   means (25) for demodulating said first and second passband equalizer output components to form first and second passband equalizer output components, and
   means (31) for identifying as the value of a first data symbol component which is in said first train the one of a plurality of predetermined reference values which is closest to the value of said first baseband equalizer output component and for identifying as the value of a second data symbol component which is in said second train the one of said reference values which is closest to the value of said second baseband equalizer output component,
characterized in that
   said first passband equalizer output component is equal to the sum of the products of at least individual ones of a predetermined number of the most recently formed ones of said line samples with respective ones of a first ensemble of coefficients and said second passband equalizer output component is equal to the sum of the products of said ones of said line samples with respective ones of a second ensemble of coefficients.

2. The invention of claim 1 wherein said QAM signal is of the transmitter form $$Re[\sum_m (a_m + j\hat{a}_m)g(t - mT)e^{j\omega_c t}]$$

where $a_m$ and $\hat{a}_m$ are real numbers the values of which are the values of said first and second data symbol components, g(t) is a predetermined real function, T is the time between successive data symbol components in each of said trains, and $\omega_c$ is the radian frequency of said carriers.

3. The invention of claim 2 further comprising means (35, 38, 123) for updating the values of said first and second ensembles of coefficients in a decision-directed manner.

4. The invention of claim 2 further comprising means (35, 38) for updating the values of said first and second ensembles of coefficients as a function of first and second error signal components, respectively, said first error signal component being equal to the difference between said first passband equalizer output component and a remodulated version of the identified value of said first data symbol component and said second error signal component being equal to the difference between said second passband equalizer output component and a remodulated version of the identified value of said second data symbol component.

5. Apparatus for use in a receiver to which is transmitted a signal s(t) of the form $$s(t) = Re[\sum_m (a_m + j\hat{a}_m)g(t - mT)e^{j\omega_c t}]$$

where $a_m$ and $\hat{a}_m$ are real numbers, g(t) is a real function, T is a predetermined symbol period and $\omega_c$ is a selected radian carrier frequency, said apparatus comprising
   means (11d) for forming a succession of line samples of the received version of said signal at a predetermined sampling frequency which is at least twice the highest frequency component of said signal,
   means (122) operative during the $m^{th}$ one of a succession of T second intervals for forming first and second passband equalizer outputs of $u_m$ and $u_m$ given by $$u_m = c_m^T p_m$$

$$\hat{u}_m = d_m^T p_m$$

wherein $p_m$ is a vector of M previously formed ones of said samples, M being a predetermined number, and $c_m^T$ and $d_m^T$ are transposes of respective vectors $c_m$ and $d_m$ each comprised of M tap coefficients having values associated with said $m^{th}$ interval, and means (25, 31) for forming decisions $a_m^*$ and $â_m^*$ as to the values of $a_m$ and $â_m$, respectively, in response to the values of $u_m$ and $û_m$, respectively.

6. The invention of claim 5 wherein said decision forming means is comprised of means (25) for forming first and second baseband equalizer outputs $y_m$ and $ŷ_m$ given by $$y_m = u_m \cos \theta_m^* + û_m \sin \theta_m^*$$

$$ŷ_m = -u_m \sin \theta_m^* + û_m \cos \theta_m^*,$$

where $\theta_m^*$ is a demodulating carrier phase estimate having a value associated with said $m^{th}$ interval, and means (31) for determining the value of $â_m^*$ to be the one of a plurality of predetermined values to which $y_m$ is the closest and for determining the value of $â_m^*$ to be the one of said plurality to which $ŷ_m$ is the closest.

7. The invention of claim 6 further comprising means (35, 38, 123) for updating said coefficients to generate the values thereof associated with the $(m+1)^{st}$ of said intervals, the updated coefficient values being given by $$c_{m+1} = c_m - \alpha p_m e_{pm},$$

$$d_{m+1} = d_m - \alpha p_m ê_{pm},$$

where $\alpha$ is a predetermined constant, where $$e_{pm} = u_m - a_{pm}^*$$

$$ê_{pm} = û_m - â_{pm}^*,$$

and where $$a_{pm}^* = a_m^* \cos \theta_m^* - â_m^* \sin \theta_m^*$$

$$â_{pm}^* = a_m^* \sin \theta_m^* + â_m^* \cos \theta_m^*.$$

8. A method for processing a received quadrature-amplitude-modulated (QAM) signal comprised of first and second trains of data symbol components having predetermined values, said components being modulated onto respective carriers which are in quadrature relation, said method comprising the steps of forming a succession of line samples of said QAM signal at a predetermined sampling frequency which is equal to at least twice the highest frequency component of said QAM signal, forming first and second passband equalizer output components in response to said line samples, demodulating said first and second passband equalizer output components to form first and second baseband equalizer output components, identifying as the value of a first data symbol component which is in said first train the one of a plurality of predetermined reference values which is closest to the value of said first baseband equalizer output component, and identifying as the value of a second data symbol component which is in said second train the one of said reference values which is closest to the value of said second baseband equalizer output component, characterized in that said first passband equalizer output component is equal to the sum of the products of at least individual ones of a predetermined number of the most recently formed ones of said line samples with respective ones of a first ensemble of coefficients and said second passband equalizer output component is equal to the sum of the products of said ones of said line samples with respective ones of a second ensemble of coefficients.

9. The invention of claim 8 wherein said QAM signal is of the transmitted form $$Re[\sum_m (a_m + jâ_m)g(t - mT)e^{j\omega_c t}]$$

where $a_m$ and $â_m$ are real numbers the values of which are the values of said first and second data symbol components, $g(t)$ is a predetermined real function, T is the time between successive data symbol components in each of said trains and $\omega_c$ is the radian frequency of said carriers.

10. The invention of claim 9 comprising the further step of updating the values of said first and second ensembles of coefficients in a decision-directed manner.

11. The invention of claim 9 further comprising the further step of updating the values of said first and second ensembles of coefficients as a function of first and second error signal components, respectively, said first error signal component being equal to the difference between said first passband equalizer output component and a remodulated version of the identified value of said first data symbol component and said second error signal component being equal to the difference between said second passband equalizer output component and a remodulated version of the identified value of said second data symbol component.

12. A method for use in a receiver to which is transmitted a signal $s(t)$ of the form $$s(t) = Re[\sum_m (a_m + jâ_m)g(t - mT)e^{j\omega_c t}]$$

where $a_m$ and $â_m$ are real numbers, $g(t)$ is a real function, T is a predetermined symbol period and $\omega_c$ is a selected radian carrier frequency, said method comprising the steps of forming a succession of line samples of the received version of said signal at a predetermined sampling frequency which is at least twice the highest frequency component of said signal, forming during the $m^{th}$ one of a succession of T second intervals first and second passband equalizer outputs of $u_m$ and $û_m$ given by $$u_m = c_m^T p_m$$

$$û_m = d_m^T p_m$$

wherein $p_m$ is a vector of M previously formed ones of said samples, M being a predetermined number, and $c_m^T$ and $d_m^T$ are transposes of respective vectors $c_m$ and $d_m$ each comprised of M tap coefficients having values associated with said $m^{th}$ interval, and forming decisions $a_m^*$ and $\hat{a}_m^*$ as to the values of $a_m$ and $\hat{a}_m$, respectively, in response to the values of $u_m$ and $\hat{u}_m$, respectively.

13. The invention of claim 12 wherein said decision forming step is comprised of the steps of
forming first and second baseband equalizer outputs $y_m$ and $\hat{y}_m$ given by $$y_m = u_m \cos \theta_m^* + \hat{u}_m \sin \theta_m^*$$

$$\hat{y}_m = -u_m \sin \theta_m^* + \hat{u}_m \cos \theta_m^*,$$

where $\theta_m^*$ is a demodulating carrier phase estimate having a value associated with said $m^{th}$ interval, and determining the value of $a_m^*$ to be the one of a plurality of predetermined values to which $y_m$ is the closest and for determining the value of $\hat{a}_m^*$ to be the one of said plurality to which $\hat{y}_m$ is the closest.

14. The invention of claim 13 comprising the further step of updating said coefficients to generate the values thereof associated with the $(m+1)^{st}$ of said intervals, the updated coefficient value being given by $$c_{m+1} = c_m - \alpha p_m e_{pm}$$

$$d_{m+1} = d_m - \alpha p_m \hat{e}_{pm},$$

where $\alpha$ is a predetermined constant, where $$e_{pm} = u_m - a_{pm}^*$$

$$\hat{e}_{pm} = \hat{u}_m - \hat{a}_{pm}^*$$

and where $$a_{pm}^* = a_m^* \cos \theta_m^* - \hat{a}_m^* \sin \theta_m$$

$$\hat{a}_{pm}^* = a_m^* \sin \theta_m^* + \hat{a}_m^* \cos \theta_m^*.$$

* * * * *